US007651277B2

(12) United States Patent
Gurreri et al.

(10) Patent No.: US 7,651,277 B2
(45) Date of Patent: *Jan. 26, 2010

(54) CONNECTOR AND RECEPTACLE CONTAINING A PHYSICAL SECURITY FEATURE

(75) Inventors: Michael L. Gurreri, York, PA (US); David D. Erdman, Hummelstown, PA (US); Bryan T. Edwards, Camp Hill, PA (US); Eric J. Hopkins, Liverpool, PA (US); David R. Baechtle, Dillsburg, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/930,751

(22) Filed: Oct. 31, 2007

(65) Prior Publication Data
US 2008/0124033 A1     May 29, 2008

Related U.S. Application Data

(62) Division of application No. 11/254,356, filed on Oct. 20, 2005, now Pat. No. 7,325,976.

(60) Provisional application No. 60/218,705, filed on Jul. 17, 2000.

(51) Int. Cl.
*G02B 6/38* (2006.01)
(52) U.S. Cl. ......................................... 385/58; 439/680

(58) Field of Classification Search .................. 385/56, 385/58, 76, 77, 78, 85; 439/677, 680
See application file for complete search history.

(56) References Cited

U.S. PATENT DOCUMENTS

| 5,274,729 | A | * | 12/1993 | King et al. ................... 385/134 |
| 5,481,634 | A | * | 1/1996 | Anderson et al. .............. 385/76 |
| 5,692,080 | A | * | 11/1997 | Lu ................................. 385/60 |
| 5,828,804 | A | * | 10/1998 | Akins et al. .................... 385/58 |
| 6,220,763 | B1 | * | 4/2001 | Stephenson .................... 385/73 |
| 6,543,941 | B1 | * | 4/2003 | Lampert ........................ 385/58 |
| 6,769,813 | B2 | * | 8/2004 | Cheng ........................... 385/78 |
| 7,258,493 | B2 | * | 8/2007 | Milette .......................... 385/55 |
| 7,325,976 | B2 | * | 2/2008 | Gurreri et al. .................. 385/58 |
| 7,336,883 | B2 | * | 2/2008 | Scholtz ........................ 385/134 |

* cited by examiner

*Primary Examiner*—Thanh-Tam T Le

(57) ABSTRACT

A network comprising: (a) a plurality of different receptacles for facilitating an optical connection to different information networks requiring different access authorization, each different receptacle coupled to one and only one different information network, each receptacle having an inner surface with a first geometry, the first geometry comprising at least a slot, a certain number of receptacles having different first geometries in which the slots are in different positions; and (b) a plurality of different plugs for coupling with the different receptacles, each plug having a second geometry, the second geometry comprising at least a key in a certain position, the certain number of plugs having different second geometries in which the keys are in different positions, each different first geometry corresponding to one and only one second geometry such that the plugs and receptacles of corresponding first and second geometries are mating pairs.

5 Claims, 10 Drawing Sheets

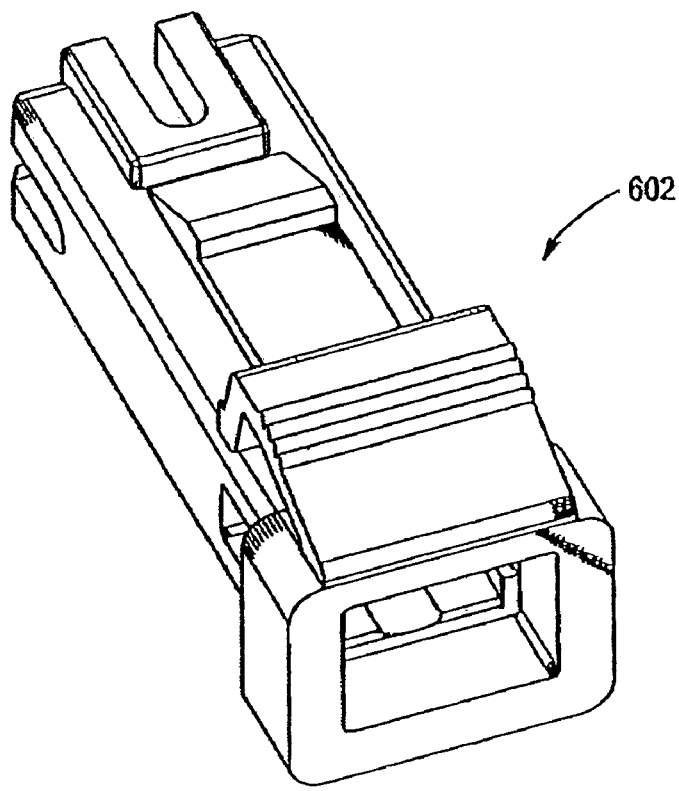
FIG. 6a
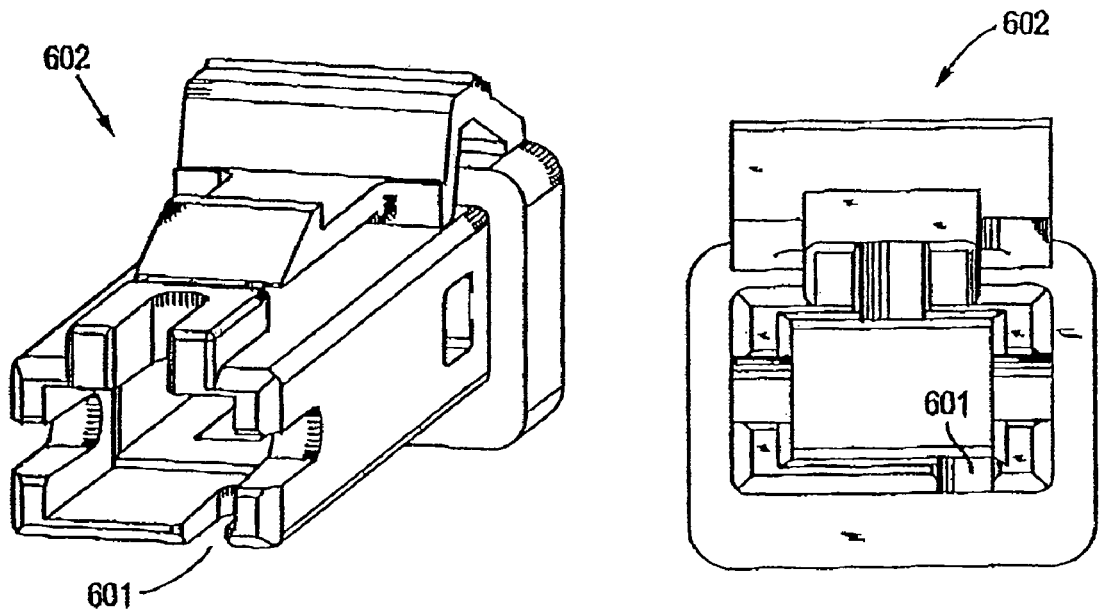
FIG. 6b
FIG. 6c

CONNECTOR AND RECEPTACLE CONTAINING A PHYSICAL SECURITY FEATURE

CROSS REFERENCE TO RELATED APPLICATIONS

This application is a divisional of U.S. application Ser. No. 11/254,356, filed Oct. 20, 2005, which claims priority to U.S. Provisional Application No. 60/218,705, filed Jul. 17, 2000, U.S. application Ser. No. 09/908,140 filed Jul. 17, 2001, and U.S. application Ser. No. 10/982,374, filed Nov. 4, 2004, all of which are hereby incorporated by reference.

FIELD OF INVENTION

The present invention relates generally to connectors for use in telecommunication networks such as voice, data or video networks. More specifically, to a connector system in which only certain plugs can mate with certain receptacles to provide discriminating access to particular information networks.

BACKGROUND

A need has developed to limit user access in data networks for security or other purposes. In recent years, buildings/offices are being equipped with different information networks, each having access to different data. It is important to restrict access to these networks to only authorized users. While some restrictions may be achieved using software approaches, such as passwords, the applicants have identified the need to restrict access further using some type of "physical barrier" to the networks. The present invention fulfills this need among others.

SUMMARY OF INVENTION

The present invention provides a connector system which uses physical barriers to prevent unauthorized users from connecting to data networks. More specifically, the applicants recognize that the best protection against unauthorized users "hacking" into data networks containing confidential information is to prevent them from even connecting to the network. This can be accomplished using physical barriers which prevent plugs from mating with receptacles. To this end, the present invention facilitates discriminating mating among similar, but different, plugs and receptacles by using a system of geometrically matched connector components which allows certain combinations of plugs and receptacles—i.e., mating pairs—to mate, while preventing other combinations from mating. Thus, the connector system of the present invention imparts physical security to a particular data network by ensuring that only authorized users who possess a particular connector component can physically connect to the particular data network.

In a preferred embodiment, the network comprises: (a) a set of optical plugs, each plug having a housing and a ferrule, the housing having a front and back orientation and having a front face defining an opening, the ferrule being disposed within the opening, the housing defining a first keying element on the front face around the opening, the keying element for each optical plug of the set of optical plugs being different; and (b) a set of optical receptacles, each receptacle having an opening to receive the plug and a ferrule-receiving portion to receive the ferrule, the ferrule-receiving portion defining a second keying element to cooperate with the first keying element, the second keying element for each receptacle of the set of the optical receptacles being different and being adapted to cooperate with one and only one of the first keying elements, wherein plugs and receptacles having keying elements that cooperate are mating pairs.

Having the keying element located on the face of the plug provides for a number of benefits. First, these features can be molded with a relatively small change to the mold dies. Specifically, the opening around the ferrule is typically defined in the molding process by a core pin which is inserted into the outer mold. Changing core pin configurations is a relatively inexpensive and easy step compared to altering the configuration of the outer molds. Therefore, as mentioned above, the connector system of the present invention provides for a variety of different plug configurations with only slight modifications to the molding process.

Having the security features on the front face of the plug also provides for an early indication of non-mateability. Specifically, since the features are located on essentially the leading edge of the plug, they are positioned optimally to "stub" as soon as possible when a plug is inserted into a non-mating receptacle. The applicants recognize that interference between connector components which are non-mating should be made as soon as possible to minimize the possibility of coupling light between connectors. That is, if close enough, optical connectors are able to couple, albeit with high loss, even if the connectors are not mechanically engaged. This condition can be meliorated by preventing the light carrying elements from getting too close—hence the desire to stub early. Stubbing early also provides an early signal to the user that the plug is non-mating and avoids the tendency of trying to force a plug into a non-mating receptacle.

Additionally, by locating the keying feature on the leading surface of the plug, the corresponding keying feature on the receptacle may be located internally and still provide an early indication of non-mateability. This is beneficial since it is desirable to locate the keying feature of the receptacle internally to minimize the ability of the keying feature to be tampered with or otherwise overridden. As discussed below, this is of particular importance in the configuration of the MT-RJ and LC connectors in which the plug defines the slot and the receptacle defines the key. If the key is removed, the security feature is breached. Having the key located within the receptacle reduces this risk.

Yet another benefit of having the keying features located on the front face of the plug is the visual indication the plug provides with respect to its keying features. That is, one can readily determine the keying configuration of the plug by visual inspection of its front face. There is no need to look into an opening to inspect the internal geometry of the plug to determine its keying configuration.

Another aspect of the present invention is an economical process for producing the plugs by altering their geometry at their front end though a simple mold modification. In a preferred embodiment, the process comprises: (a) molding a first housing for a first plug of a set of plugs using a core pin to define an opening having a first keying element in a first position; and (b) molding a second housing for a second plug of the set of plugs by adjusting only the core pin to define the opening having a first keying element in a second position different than the first position.

BRIEF DESCRIPTION OF DRAWINGS

FIGS. 6(a)-6(c) show top perspective, front and rear views, respectively, of an MT-RJ connector plug having security features of the present invention.

DETAILED DESCRIPTION OF PREFERRED EMBODIMENTS

Figure 1:
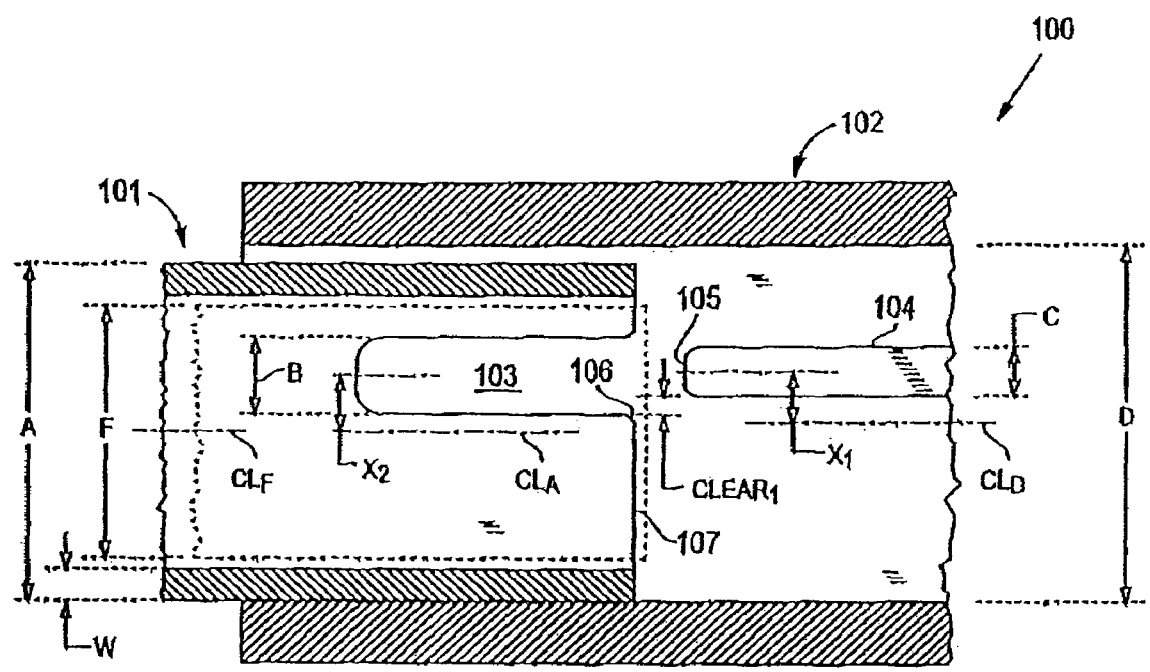
FIG. 1 shows a mating pair of the present invention in which a plug is being inserted into a receptacle.

The present invention relates to a connector system comprising a series of connector components which interconnect with each other in a discretionary way. Referring to FIG. 1, a preferred embodiment of a mating plug 101 and receptacle 100 of the connector system is illustrated. As shown, the plug 101 is partially inserted into the receptacle 100, which, in this embodiment, is a jack having a tub portion 102. Although a jack is discussed herein in detail, it should be understood that the receptacle of the present invention is not restricted to a jack and may be any structure configured to receive a plug, including, for example, an adapter for connecting two plugs together or an integral connector on an active device (e.g., transceiver) or passive device (e.g., splitter).

The plug typically contains a conductive element, such a fiber or wire, which mates with a similar element in the receptacle. In fiber optic applications, it is common for the conductive element to be contained in a ferrule, which in turn is housed by the plug. In a preferred embodiment, the ferrule is an MT-type ferrule.

The outer surface of the plug 101 and the inner surface of the tub 102 have first and second geometries, respectively, which cooperate to allow only certain pairs of plugs and receptacles to mate (herein "mating pairs," "mating plug and jack," or "keyed pair"), and which physically interfere for all other combinations of plugs and jacks (herein "non-mating pairs," "non-mating plugs and jacks" or "non-keyed pairs"), thereby preventing non-mating plugs and jacks from effecting an optical or electrical coupling.

The first and second geometries may embody any known keying mechanism which discriminates between connector components. Such keying mechanisms include, for example, a key and slot relationship between the plug and jack, a receptacle dimensioned to receive only certain sized or shaped plugs, and even a magnetic signature for either attracting (for mating pairs) and repulsing (non-mating pairs). Preferably, the keying mechanism involves just a slight modification to the plug and jack such that essentially the same molds can be used to manufacture connectors of different keyed pairs. Although molding is preferred, it is should be understood that other techniques for producing the first and second geometries can be used including, for example, over molding and machining.

In a preferred embodiment, the invention uses a key and slot mechanism. For simplicity, the term "keying elements" refers collectively to the key and the slot. Specifically, the slot can be embodied in the first or second geometry and the key can be embodied in the other geometry. In the particularly preferred embodiment shown in FIGS. 1-4, the key is part of the second geometry, while the slot is part of the first geometry; that is, the plug 101 has a slot 103 and the tub portion 102 of the jack has a key 104.

Figure 4:
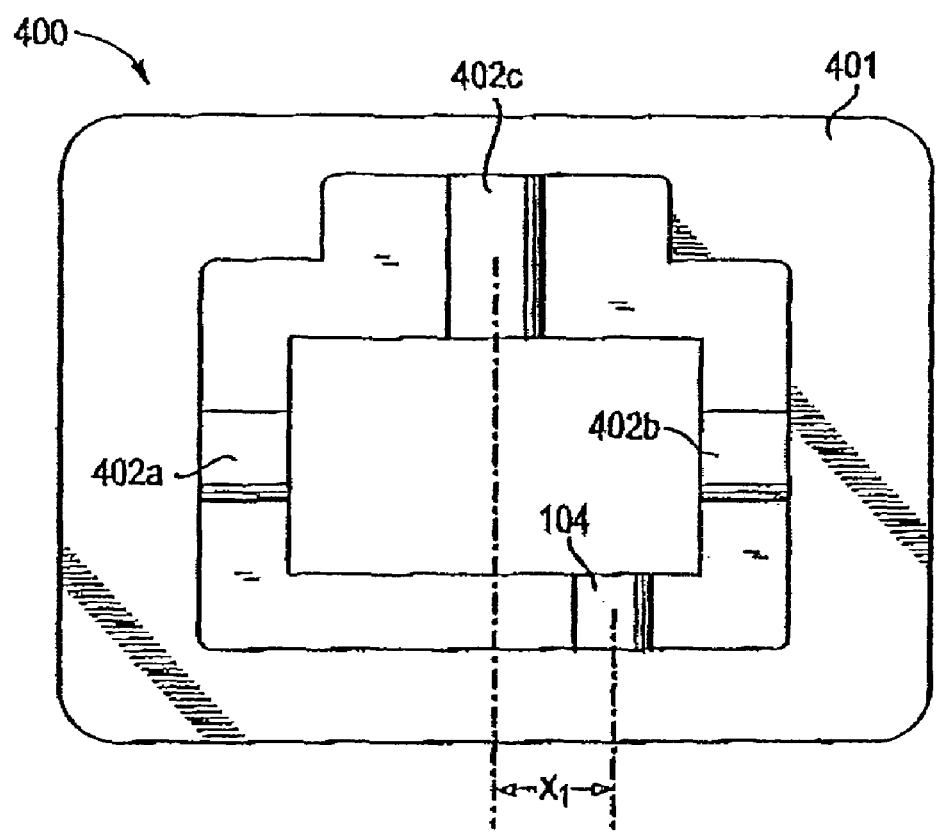
FIG. 4 shows an end view of a receptacle having a key which accepts a key of a plug of a mating pair.

This configuration is preferred since the key may cooperate with other "ribs" on the connector for pre-alignment purposes. More specifically, with particular reference to FIG. 3, an end view of housing 301 of the plug 101 is shown. The housing comprises four walls each wall having a slot 103, 302a, 302b, and 302c, respectively. FIG. 4 depicts an end view of housing 401 of the tub 400 in which the key 104 and ribs 402a, 402b, and 402c are disposed on the walls of the housing. The key 104 and the ribs 402a, 402b, and 402c cooperate with the slots 103, 302, 302a, 302b, and 302c, respectively, to effect pre-alignment of the ferrule located within the plug with the jack before final mating of the connector plug with the connector jack. The final mating may be between the conductive elements of the connector system, such as, for example, between a couple of MT-type ferrules, which employ precise alignment pins/receiving holes on the ferrule face. Such ferrules are well known in the art. By pre-aligning the MT ferrules through the synergistic use of the key and slot, the inter-engagement of the closely-toleranced alignment pins/receiving holes is facilitated. The above-described synergistic keying and aligning feature of the present invention is realized with the MT-RJ connector (Tyco Electronics, Harrisburg, Pa.).

Figure 2:
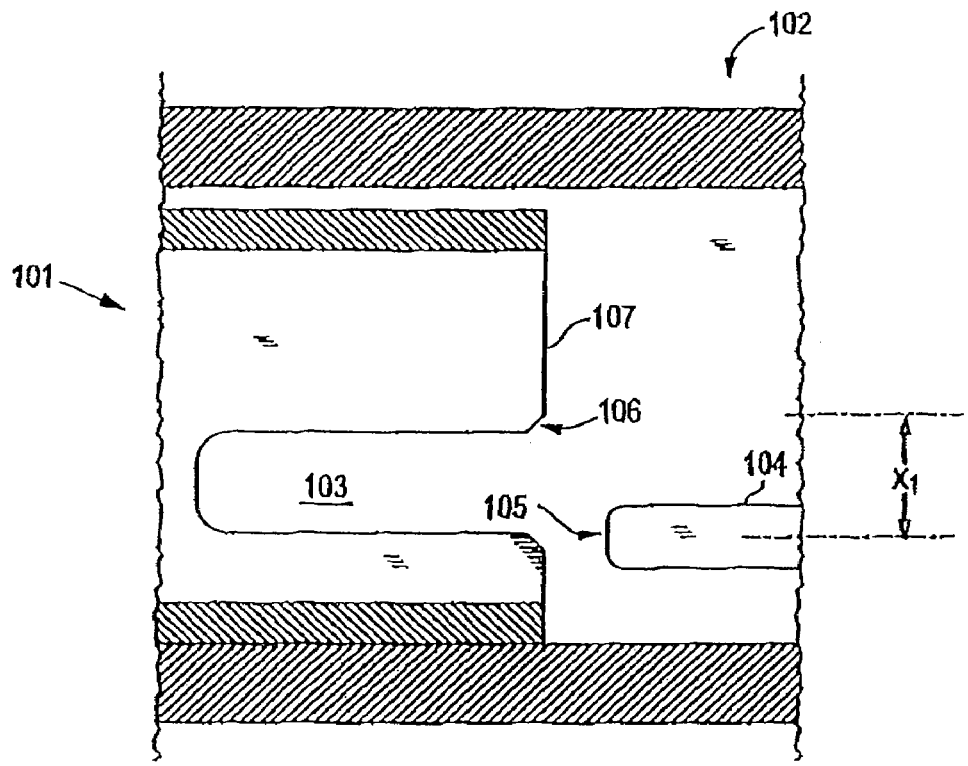
FIG. 2 shows a non-mating pair in which a plug has a slot which is not in the proper position to accept a key of a receptacle.
Figure 3:
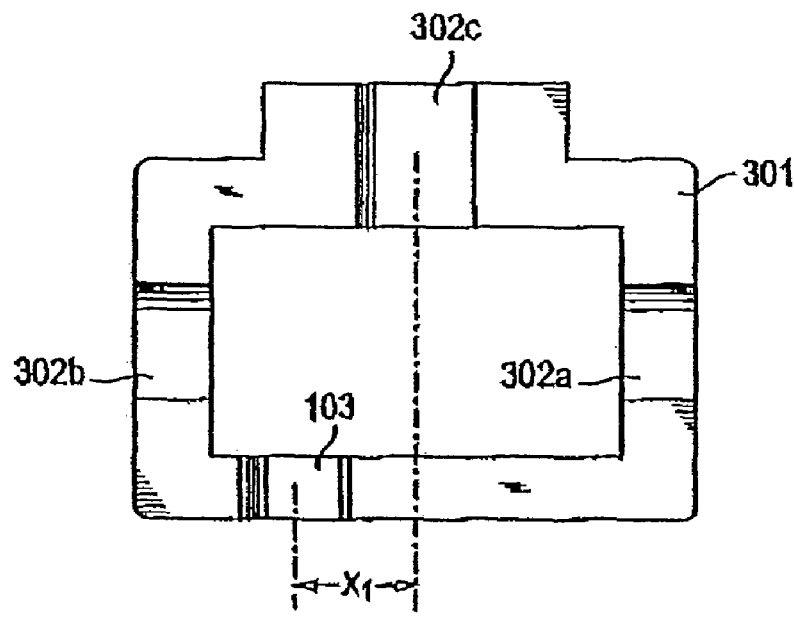
FIG. 3 shows an end view of a plug showing a slot which accepts a key of a mating receptacle.

In a preferred embodiment, the mating end of the key 104 contains a flat portion shown as 105 and the mating end of the plug 101 has a chamfers 106 on the corners of the edges of the slot 103, while the remainder of the mating end of the plug comprises a flat portion 107. The radius corners on the key 106 and the chamfers on the plug 107 work as a guiding device and provide for the necessary alignment between the key and the slot when the plug is inserted into the tub of the jack. On the other hand, as shown in FIG. 2, when a user attempts to mate two non-mating plug and jack components, the flat portion of the key 105 contacts the flat portion of the plug 107 and provides for definite physical interference between the plug and jack when the slot and key do not correspond. Accordingly, the use of this geometry prevents a user from forcing two non-mating plugs and jacks together. Therefore, the physical interference provided between the flat portion 105 of the tub and the flat portion 107 of the key assures that only desired combinations of plugs and jacks will mate.

Figure 5:
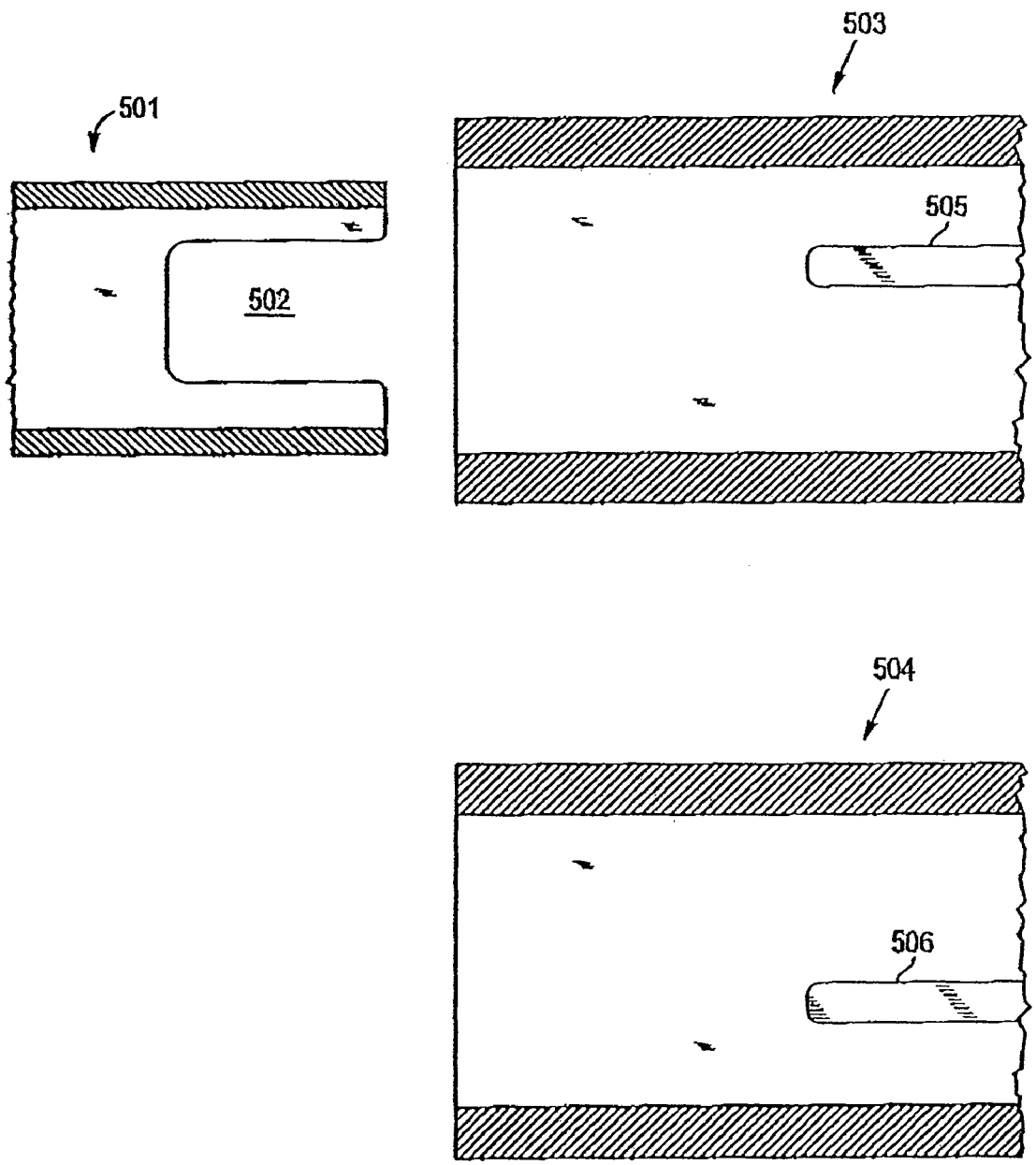
FIG. 5 shows a plug having a slot configuration capable of mating with jacks having keys in different positions.

The position of the key 104 on the tub 102 and the slot 103 on the plug 101 can be varied in such a manner so that a plurality of mutually-exclusive slot and key positions are formed. In one embodiment, the series of key and slot locations are mutually exclusive so that there is a one-to-one correspondence between jacks and plugs. In another embodiment, certain plugs may be configured to mate with a variety of different jacks. For example, it may be worthwhile to give network administers or people with high security clearance certain "master" plugs which are capable of mating with a number of jacks having different slot positions. Referring to the figures, FIG. 5 shows an embodiment of a master plug 501 which has a slot 502 that is configured (which, in this embodiment, means it is wide enough) to mate with jacks 503 and 504 which have different key positions 505 and 506, respectively. Although a wide slot is used in this embodiment to effect mating with two or more jacks having different key configurations, it should be understood that other embodiments are possible, such as, for example a plug with two or more slots.

The number of possible mutually exclusive mating pairs for a given plug and receptacle is a function of the physical parameters of the plug and the receptacle. More specifically, with reference to FIGS. 1-4, mutual exclusivity is ensured by adhering to the following relationships:

$$X1 - C/2 + (D-A) + \Delta <= F/2 \quad (1)$$

$$X2 + B/2 < A/2 - W \quad (2)$$

$$X1a + \text{Clear1} + Z = X1b \quad (3)$$

wherein:
A=the width of the plug 101;
B=the width of the slot 103 on the plug 101;
C=the width of the key 104;
D=the distance across the opening of the tub;
F=the width of the ferrule residing within the plug;
Δ=CLF−CLA, wherein
  CLA=centerline of the width of the plug; and
  CLF=centerline of the ferrule residing within the plug.
X1=the distance from the center of the opening in the tub 102 to the center of the key 104 for each mutually exclusive position.
X2=the distance from the center of the plug 101 to the center of the slot 103 for each mutually exclusive position;
X1a=the X1 distance for a sequentially first key in a series of connectors;
X1b=the X1 distance for a sequentially second key in a series of connectors;
W=the wall thickness of the plug housing
Z=the minimum distance required to ensure that the flat portion of the key does not contact the flat portion of the plug 107 when a user attempts to mate a mating pair;
Clear1=the clearance distance between the center side of the key and the center side of the slot.

These relationships must be satisfied for the mating pairs to mate and for the non-mating pairs to definitely not mate. Specifically, for a mating pair, Relationship (1) requires that half the ferrule width must be no less than $X_1$ less one half of C added to the difference between the width of the tub opening D less the width of the plug added to the difference between the centerline of the ferrule within the plug and the centerline of the plug. This ensures that the key is not positioned outside of the area on which at least a portion of the ferrule will reside. By adhering to this parameter, the key will have some overlap with the ferrule, and thus will provide for pre-alignment of the ferrule in the same manner as do the ribs on the three sides of the ferrule without the key.

Relationship (2) requires that $X_2$ added to one-half of dimension B is less than one-half of dimension A less W. This assures that the slot resides on the plug within the confines of the plug walls.

Finally, according to Relationship (3), for each mutually exclusive position, the distance $X_1$ for the first connector in the system $(X_{1a})$ added to Clear$_1$ added to a predefined interference interval Z would correspond to the distance $X_1$ for the next slot/key position $(X_{1b})$. Z is the minimum distance required to ensure that the flat portion of the key does not contact the flat portion of the plug 107 when a user attempts to mate the two portions of a connector which is intended to mate.

By way of example, four mutually exclusive locations for locating the slot on the plug housing and the key on the tub are defined below for an MT-RJ connector. The MT-RJ connector has the following dimensions:

A=7.15±0.05 mm
B=1.25 mm
C=0.95±0.04 mm
D=7.24±0.04 mm
F=4.5±0.04 mm
Clear1=0.15 mm
W=0.8 mm Based on these MT-RJ dimensions, it has been found that the following $X_1$ key positions satisfy the relationships above:

| Mating pair | Key Position | $X_1$ |
| --- | --- | --- |
| 1 | 1 | 0.8 mm |
| 2 | 2 | 1.6 mm |
| 3 | 3 | −0.8 mm |
| 4 | 4 | −1.6 mm |

Although the data above indicates four mutually exclusive positions, it should be understood that additional positions are possible within the parameters of the MT-RJ connector. Additionally, it should be understood that the combinations of various key positions can be used to increase the number of permutations of mating pairs. For example, in addition to the four mating pairs listed above, additional mating pair configurations may obtained from the following combinations of key positions:

| Mating pair | Key Positions |
| --- | --- |
| 5 | 1, 2 |
| 6 | 1, 2, 3 |
| 7 | 1, 2, 3, 4 |
| 8 | 2, 3 |
| 9 | 2, 4 |
| 10 | 2, 3, 4 |
| 11 | 3, 4 |
| 12 | 1, 3 |
| 13 | 1, 4 |
| 14 | 1, 3, 4 |
| 15 | 1, 2, 4 |

In a preferred embodiment, the key and slot components are combined with the industry standard MT-RJ connector. FIG. 6 and FIG. 7 show the key-slot combination added to the MT-RJ connector as produced by Tyco Electronics of Harrisburg, Pa.

Figure 7A:
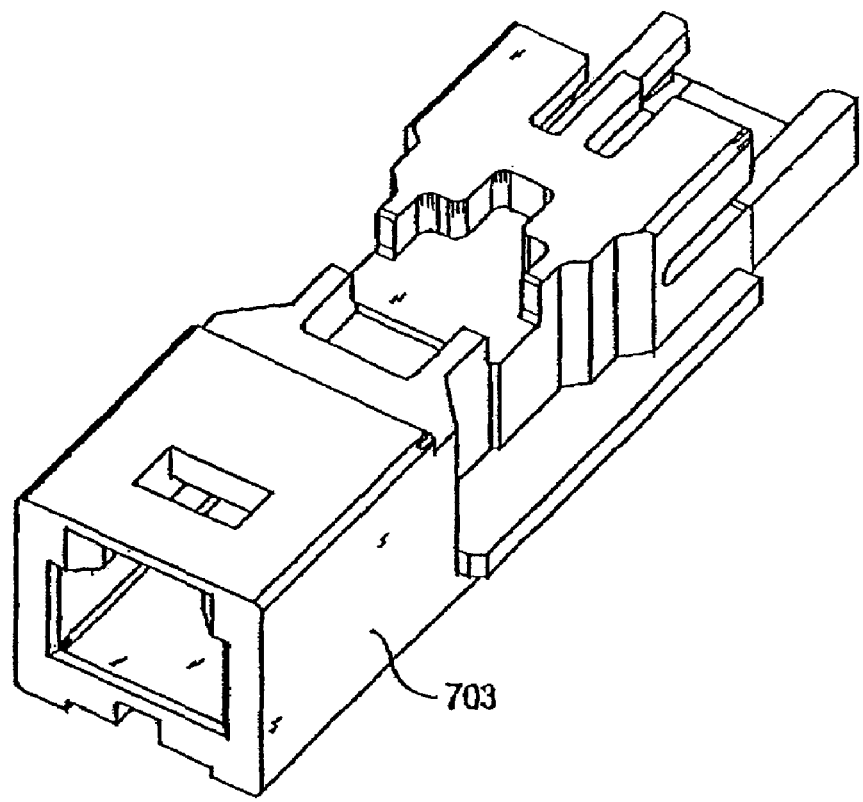
FIGS. 7(a) and 7(b) show top perspective and front views, respectively, of an MT-RJ connector receptacle.
Figure 7B:
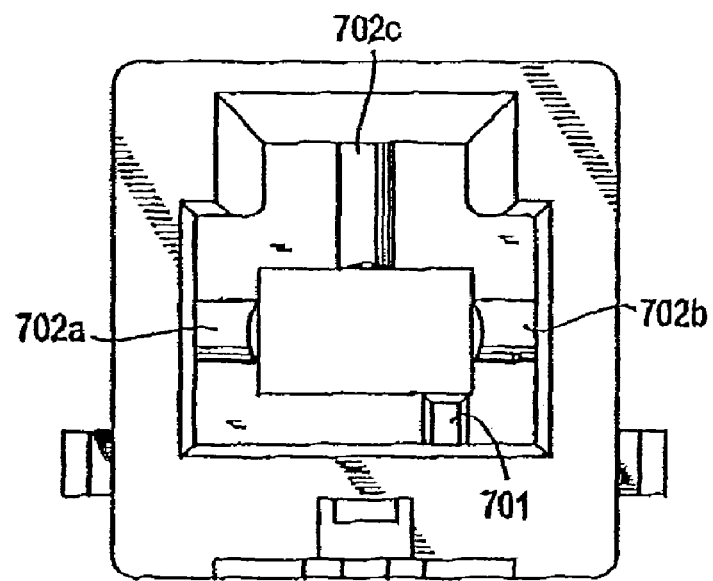

FIGS. 6(a)-(c) show the plug 602 of the MT-RJ connector combined with the slot 601 of the present invention. FIGS. 7(a) and 7(b) show the center tub portion 703 of an MT-RJ connector jack. The key is shown as 701 located in one of the plurality of possible positions. The three pre-alignment ribs are shown as 702a, 702b, and 702c. The key 701 functions as the discriminating member for allowing or preventing mating with a plurality of plugs, while at the same time functioning as the pre-alignment member for the remaining side of the ferrule not aligned with ribs 702a, 702b, and 702c.

To provide a simple and readily apparent indication to the user of which plugs mate with which receptacles, it is preferable to mark mating pairs with indicia or color to indicate their compatibility. In a preferred embodiment, the components of a mating pair are a similar color different from all others used in the connector system.

Figure 8:
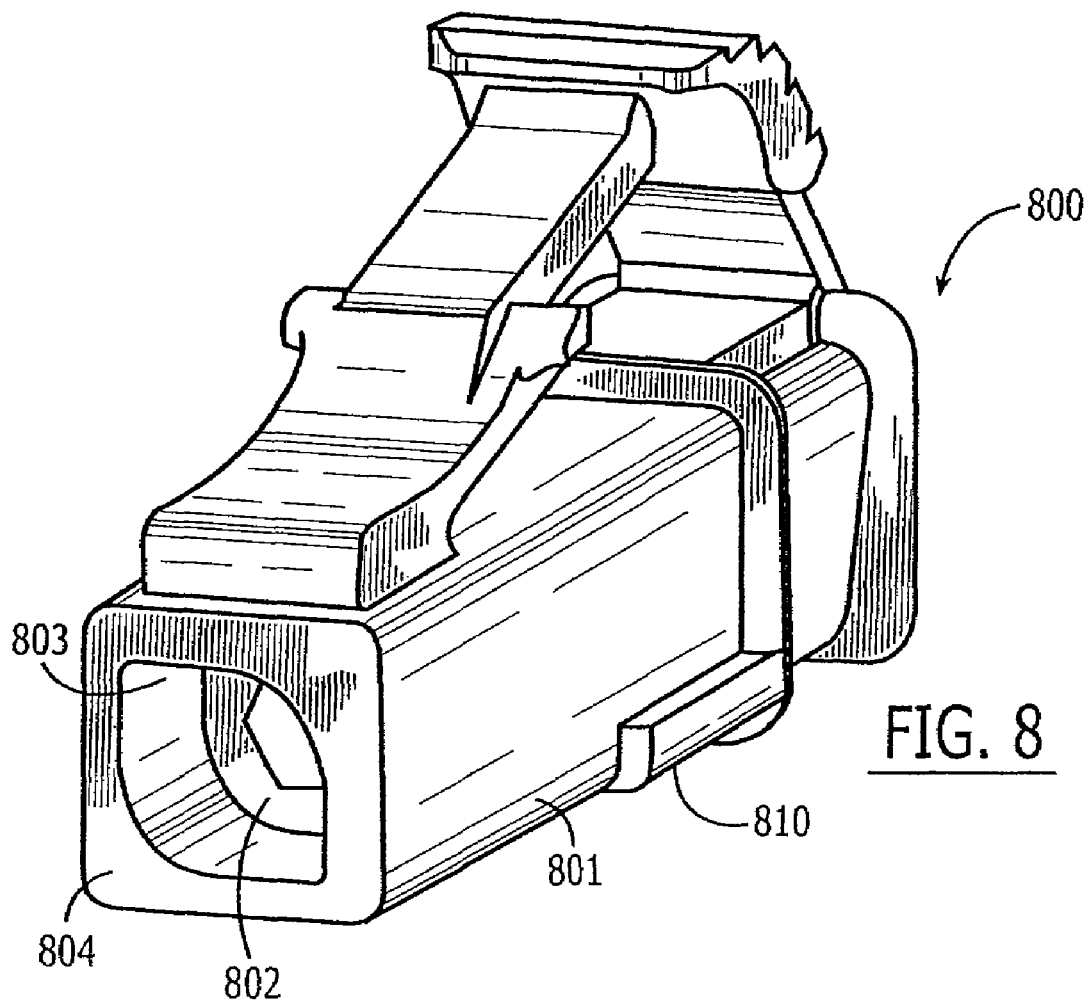
FIG. 8 shows a front and side perspective view of an LC connector plug having security features of the present invention.
Figure 9:
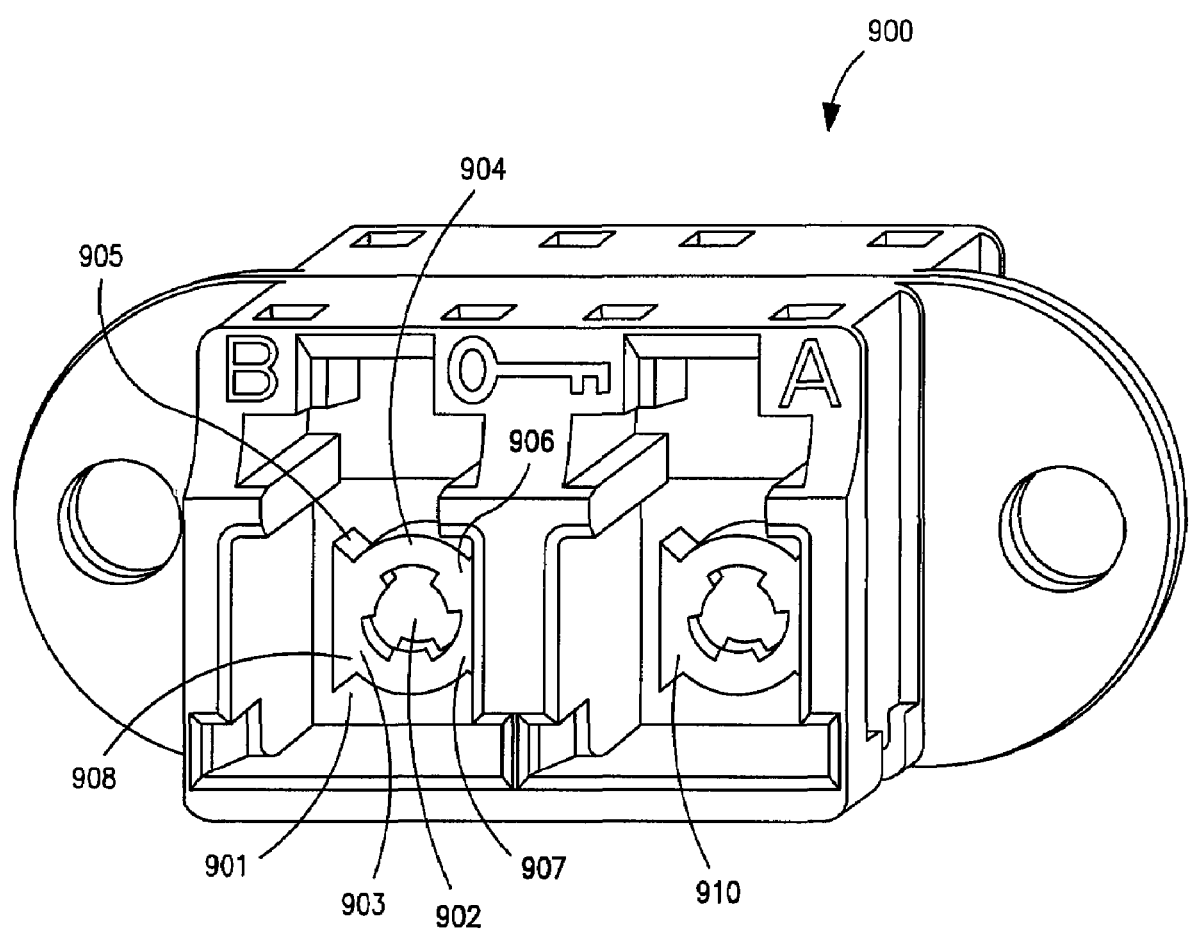
FIG. 9 shows a front perspective view of an LC connector receptacle having security features of the present invention.

Referring to FIGS. 8 & 9, another embodiment of the connector system of the present invention is shown. FIG. 8 shows a plug 800, which is one of a set of different plugs in the system. Each plug has a housing 801 which defines a first geometry. The first geometry comprises a front face 804 with an opening 802 (demarcated with dotted line), and a ferrule (not shown) within said housing and disposed in said opening. Around said opening 802 is a first keying element 803. The keying element for each different optical plug of said set of optical plugs is different.

FIG. 9 shows a receptacle 900 for receiving a particular plug (not shown) and is one of a set of different receptacles. The receptacle 900 has a second geometry configured to receive the first geometry of a plug. The second geometry comprises a cavity 901 to receive a plug and a ferrule-receiving portion 904 having a borehole 902 to receive the ferrule of the plug. The ferrule-receiving portion 904 defines a second keying element 903 to cooperate with a first keying element of a particular plug. The second keying element for each receptacle of said set of said optical receptacles is different and is adapted to cooperate with one and only one first keying element. Plugs and receptacles having keying elements that cooperate are referred to herein as "mating pairs."

Although the LC connector system described above is a single-fiber ferrule rather than a multifiber ferrule, the general keying features are essentially the same as those described above with respect to the MT-RJ connector. Further, the keying features of the plug 800 and receptacle 900 of the present invention may be implemented in any well known optical connector including, for example, other single-fiber ferrule connectors such as MU, SC, ST, or FC connectors. For illustrative purposes, the security features are described with respect to the LC connector system, which includes the LC plug (plug 800) and LC adapter (receptacle 900). Aside from the security features described herein, these connector components are the same as those specified in the LC Standard available on-line or from OFS (Japan), and the common features between them will not be addressed herein.

Like the MT-RJ embodiment described above, the keying features of the LC connector are contained on the front face of the plug. This is important for a number of reasons. First, these features can be molded with a relatively small change to the mold dies. Specifically, the opening around the ferrule is typically defined in the molding process by a core pin which is inserted into the outer mold. Changing core pin configurations is a relatively inexpensive and easy step compared to altering the configuration of the outer molds. Therefore, as mentioned above, the connector system of the present invention provides for a variety of different plug configurations with only slight modifications to the molding process.

Having the security features on the front face of the plug also provides for an early indication of non-mateability. Specifically, since the features are located on essentially the leading edge of the plug, they are positioned optimally to "stub" as soon as possible when a plug is inserted into a non-mating receptacle. The applicants recognize that interference between connector components which are non-mating should be made as soon as possible to minimize the possibility of coupling light between connectors. That is, if close enough, optical connectors are able to couple, albeit with high loss, even if the connectors are not mechanically engaged. This condition can be meliorated by preventing the light carrying elements from getting too close—hence the desire to stub early. Stubbing early also provides an early signal to the user that the plug is non-mating and avoids the tendency of trying to force a plug into a non-mating receptacle.

Additionally, by locating the keying feature on the leading surface of the plug, the corresponding keying feature on the receptacle may be located internally and still provide an early indication of non-mateability. This is beneficial since it is desirable to locate the keying feature of the receptacle internally to minimize the ability of the keying feature to be tampered with or otherwise overridden. As discussed below, this is of particular importance in the configuration of the MT-RJ and LC connectors in which the plug defines the slot and the receptacle defines the key. If the key is removed, the security feature is breached. Having the key located within the receptacle reduces this risk.

Yet another benefit of having the keying features located on the front face of the plug is the visual indication the plug provides with respect to its keying features. That is, one can readily determine the keying configuration of the plug by visual inspection of its front face. There is no need to look into an opening to inspect the internal geometry of the plug to determine its keying configuration.

The keying elements that may be used in the LC connector are the same as those described above with respect to the MT-RJ embodiment. In a preferred embodiment, the keying elements comprise a slot and a key. The slot can be embodied in the first or second geometry and the key can be embodied in the other geometry. In a first configuration, the slot is embodied in the first geometry and the key is embodied in the second geometry, while in a second configuration, the key is embodied in the first geometry and the slot is embodied in the second geometry.

The LC connector shown in FIGS. 8-9 has a first configuration. This configuration is advantageous for a number of reasons. First, the first keying features do not prevent a plug from mating with an ordinary receptacle. This is particularly beneficial since a plug with keying elements can be nevertheless "mated" with standard equipment used for the polishing, testing and inspection of the ferrule. Specifically, the polishing, testing and inspection equipment for single fiber ferrules typically comprises a ferrule receiving interface, similar to that of a receptacle, which receives just the ferrule disposed in the opening of the housing. The housing is not engaged. If a key protrudes into the space between the opening and the ferrule, it would preclude coupling with this existing equipment. Conversely, by having slots extend radially outward from the opening, and thereby maintain the space between the opening and the ferrule, a standard ferrule receiving interface, which does not have keying features, can be used. For example, a plug having a first keying element can be coupled to a standard LC ferrule receiving interface connected to a polishing device for polishing the ferrule, or to a microscope for inspecting the endface geometry of the ferrule, or to a photodetector for testing optical attenuation of the ferrule assembly.

Furthermore, since the physical "barrier"—i.e., the key—is located on the receptacle in the first configuration, it will serve to facilitate discriminatory mating among, not only plugs employing security features, but also existing plugs which have no security features of the present invention. Specifically, if a slot in the plug is necessary to accommodate the key of the receptacle, then plugs without slots will not mate with receptacles having the key. Therefore, ordinary, non-secure type plugs which do not have the slot in the proper position will not mate with the receptacle. In contrast, a non-secure receptacle will mate with a secure plug of the first configuration. Specifically, since the physical barrier is absent from the receptacle, any ordinary or secure plug can mate with it. As discussed below, the situation with the second configuration is opposite from that of the first, meaning that a secure plug cannot mate with a non-secure receptacle but a secure receptacle can mate with a non-secure plug. To provide for discrimination between secure and non-secure connectors components, a secondary key is added to the system as discussed below.

A connector system having the second configuration offers certain benefits, but also presents certain challenges. One benefit is that the space consuming security feature—i.e., the slot—resides in the receptacle which is typically larger than the plug and better suited for accommodating this feature. That is, since a slot is defined by the material around it, a slot requires more room than a key. The receptacle does not have the same space constraints as a plug (which is designed to be inserted in the receptacle) and may be more capable of accommodating the slot than the plug. Additionally, it may be preferable to have one "master" plug which plugs into all receptacles having security features. This is easily accomplished with a connector system of the second configuration. Specifically, the master plug would simply be one having no key to interfere with the first geometry of the receptacle. The simplicity in offering a master plug in the connector system of the second configuration also gives rise to a challenge facing the system—the ability of non-secure plugs to mate with secure receptacles (discussed below).

Figure 10:
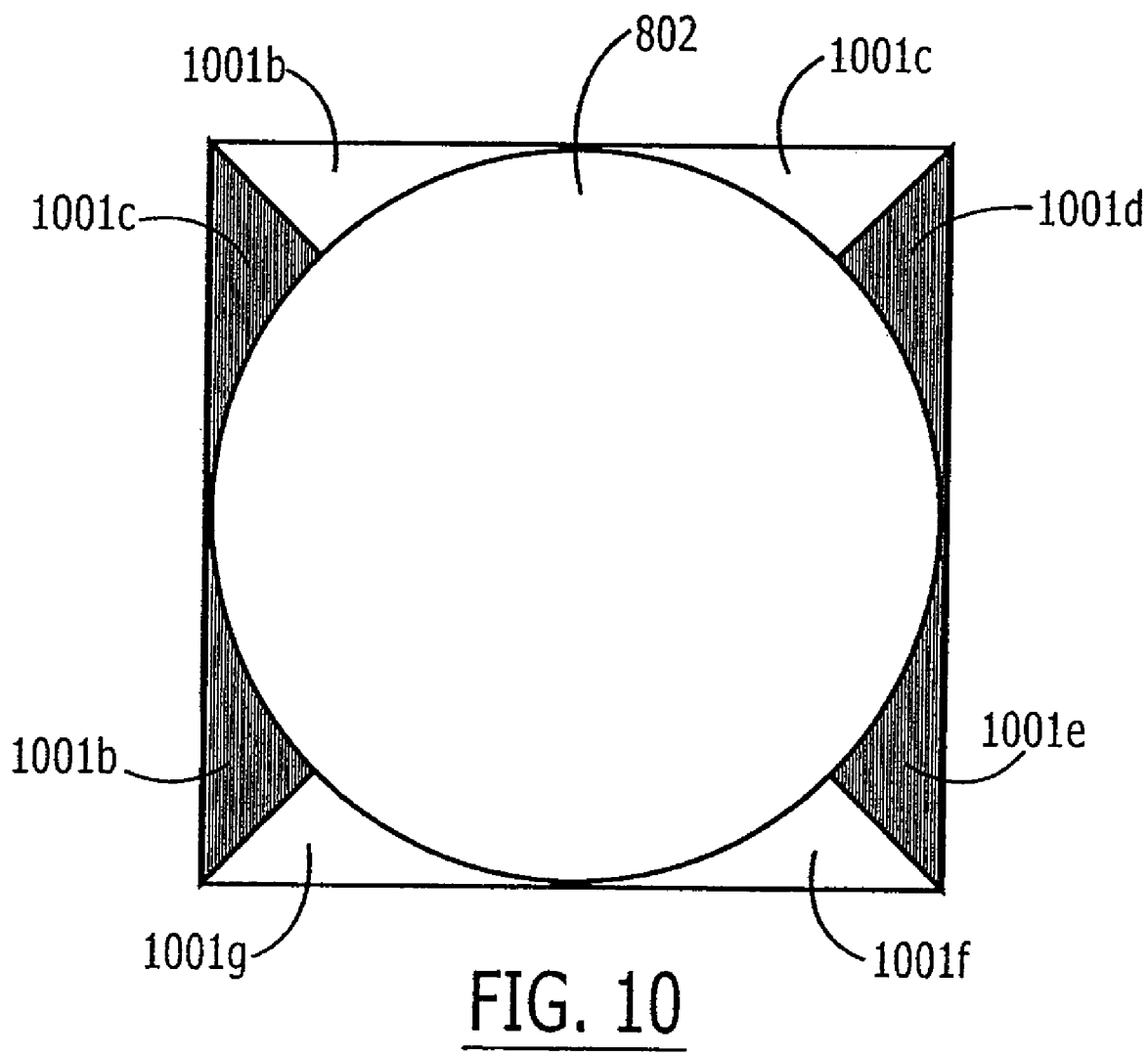
FIG. 10 shows schematically the discrete positions available for the first keying element.

Referring to FIG. 10, a preferred embodiment of the first keying element 803 is shown schematically. The figure shows the opening 802 in which the ferrule is disposed and which is configured to receive the ferrule-receiving portion 904. Positioned around the opening 802 are spatially discrete positions 101(a)-(h) for the first keying element. Similar discrete positions exist around the ferrule-receiving portion 904 (see FIG. 9) to define the location of the second keying element. In a preferred embodiment, the first keying element comprises one or more slots in a combination of positions 101(a)-(h) and the second keying element comprises keys in corresponding positions. It should be understood that to facilitate cooperation between the first and second keying elements, the combination of slot positions in the plug must be the same as the combination of key positions in the ferrule receiving portion 904. In other words, each slot must correspond to a key in the same relative position to facilitate a mating pair. For example, a plug having a first keying element which comprises slots in positions 1001a, 1001d, 1001e, and 1001d, will mate with a receptacle having a second keying element comprising keys 905, 906, 907, and 908 is the same relative positions (see FIG. 9).

The number of slots in the combination of first keying elements depends upon the number of possible positions of the slots. Specifically, the number of possible permeations of different mating pairs is given by the following equation:

$$nCr = \frac{n!}{r! \cdot (n-r)!}$$

wherein:

n equals the number of spatially discrete positions for the keying elements, and r is the number of positions occupied.

$_nC_r$ therefore provides for the number of mutually exclusive combinations or permeations of mating pairs.

Below is a table providing data on the theoretical number of mating pairs, $_nC_r$, for different n and r values.

| Number of Spatially Discrete Positions n | Number of Positions Occupied r | Number of Mutually Exclusive Combinations $_nC_r$ |
|---|---|---|
| 4 | 1 | 4 |
|   | 2 | 6 |
|   | 3 | 4 |
|   | 4 | 1 |
| 5 | 1 | 5 |
|   | 2 | 10 |
|   | 3 | 10 |
|   | 4 | 5 |
|   | 5 | 1 |
| 6 | 1 | 6 |
|   | 2 | 15 |
|   | 3 | 20 |
|   | 4 | 15 |
|   | 5 | 6 |
|   | 6 | 1 |

From this data, it is clear that the maximum number of permutations (i.e., $_nC_r$) is reached when the number of positions occupied equals n divided by 2. Therefore, in the preferred embodiment, either n/2 slots (if n is an even integer) or (n±1)/2 slots (if n is an odd integer) of spatially discrete positions are occupied by either a slot with respect to the plug or a key with respect to the receptacle. (For purposes of simplicity, hereinafter, n will be presumed to be an even number.) Therefore, using the equation above, the embodiment shown in FIGS. 8, 9 and 10, in which n equals 8 and r equals 4, the maximum number of permutations of mating pairs is 70.

Figure 11:
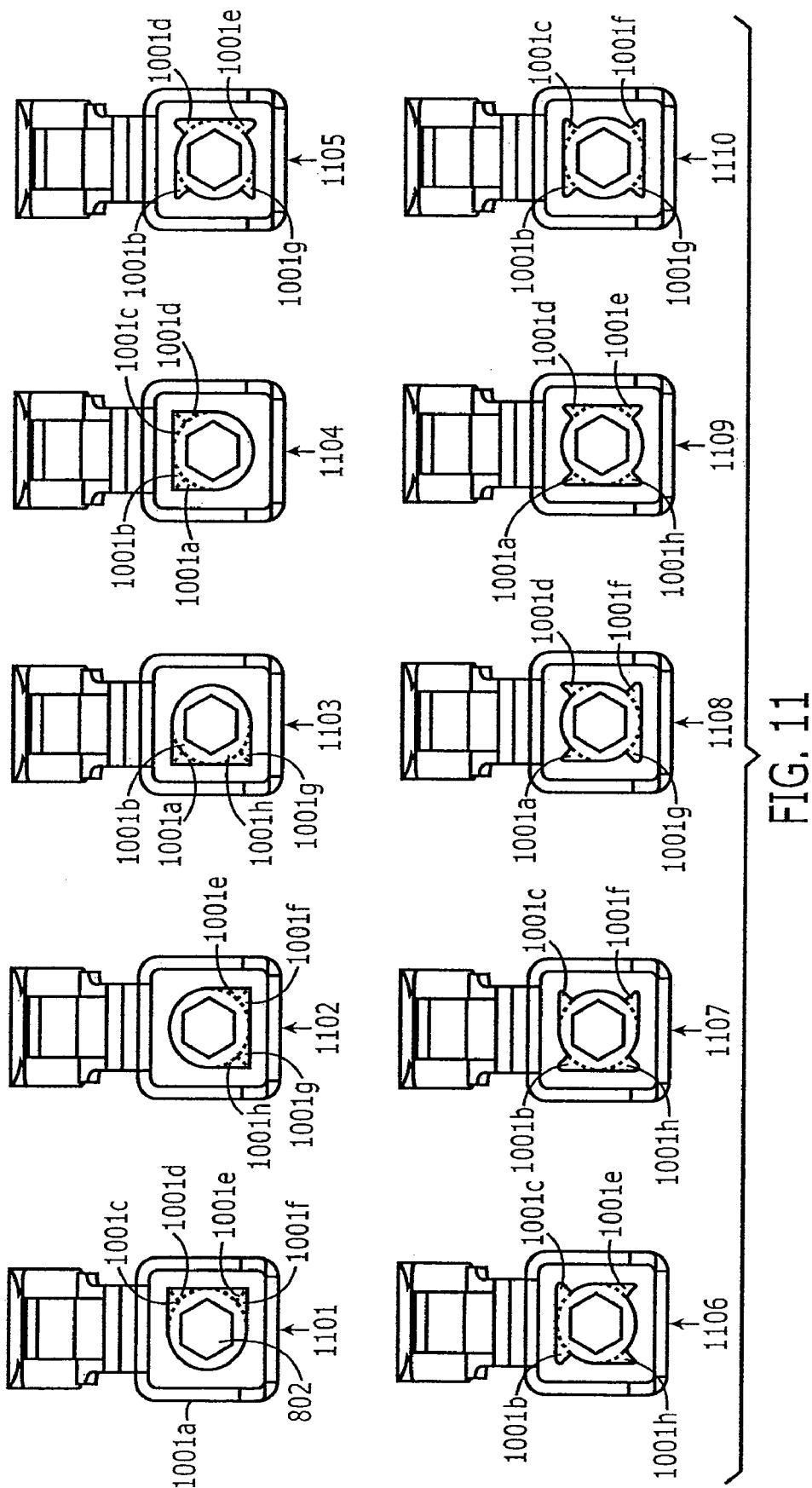
FIG. 11 shows a series of LC connector plugs in which the first geometries are different.

Referring to FIG. 11, different of plugs 1101-1110 of a set are shown in which the first keying elements comprise slots in different combinations of positions as defined in FIG. 10 and accompanying text. In these drawings, the opening 802 which is constant in all the plugs and the slot positions are shown with a phantom line. Specifically, plug 1101 shows slots in a combination of positions 1001c, 1001d, 1001e, and 1001f; plug 1102 shows slots in a combination of positions 1001e, 1001f, 1001g, and 1001h; plug 1103 shows slots in a combination of positions 1001a, 1001b, 1001g, and 1001h; plug 1104 shows slots in a combination of positions 1001a, 1001b, 1001c, and 1001d; plug 1105 shows slots in a combination of positions 1001b, 1001d, 1001e, and 1001g; plug 1106 shows slots in a combination of positions 1001b, 1001c, 1001e, and 1001h; plug 1107 shows slots in a combination of positions 1001a, 1001c, 1001f, and 1001h; plug 1108 shows slots in a combination of positions 1001a, 1001d, 1001f, and 1001g; plug 1109 shows slots in a combination of positions 1001a, 1001d, 1001e, and 1001h; and plug 1110 shows slots in a combination of positions 1001b, 1001c, 1001f, and 1001g. It should be understood that each of the plugs described above will mate with a receptacle having a key in the same position. For example, plug 1109 will mate with receptacle 900 which has keys 904, 905, 906 and 907 in the same positions as the slots (i.e., 1001a, 1001d, 1001e, and 1001h).

In a preferred embodiment, the connector system of the present invention may contain one or more master plugs of varying levels. That is, there may be lower-level master plugs, which can mate with receptacles of two different networks, or higher-level master plugs, which can mate with receptacles of three or more networks. The difference in the level of the mater plug is a function of the r number of slots occupying n possible positions—the more slots there are, the higher the plug's level. Specifically, the master plug comprises a first keying element having a third combination of greater than n/2 slots, in which the slots occupy the positions of at least two different first combinations as described above. Higher level master plugs have slots which occupy the positions of three or more different first combinations.

Aside from showing the different combinations of keying elements, FIG. 11 illustrates the ease with which the various plugs can be made. Specifically, in a preferred embodiment, the process of manufacturing an optical connector comprises molding different plugs by adjusting the core pin which defines the opening 802 while leaving the outer molds essentially the same. In other words, rather than using different molds to modify the outside of the housing—which can be expensive, the present invention involves simply adjusting the core pin—which is relatively inexpensive. Referring to FIG. 11, the process is described in greater detail. The process comprises first molding a first housing 1101a for a first plug 1101 of a set of plugs 1101-1110 using a core pin (not shown) to define an opening 802 and a first keying element in a first combination of positions 1001c, 1001d, 1001e, and 1001f. Next, a second housing 1102a for a second plug 1102 is molded by adjusting only said core pin to define first keying element in a second combination of positions 1001e, 1101f, 1001g, and 1101h, which is different from first combination of positions.

To effect the different combinations of positions, the core pin is preferably adjusted by rotating it in θ increments, in which θ is equal to 360°/m, wherein m is an integer. Preferably m is an integer from 2-18, more preferably from 2-5, and even more preferably from 3-4. In the embodiment shown in FIG. 10, m is 4, thus the core pin is adjusted by rotating it in 90° increments. It should be clear that rotating this core pin in 90° increments in subsequent molding operations will produce plugs 1103 and 1104, respectively. Plugs 1105-1108 were prepared using a different core pin which was also rotated in 90° increments. Plugs 1109 and 1110 were prepared using yet a different core pin which was rotated in a 90° increment. It is worthwhile to mention that since the combination of positions 1001b, 1001c, 1001f, and 1001g is symmetrical with respect to two axes, the core pin can only be rotated by one 90° increment before repeating the same combination of positions.

Once the housings are prepared, a ferrule is disposed in the opening of each housing to form a subassembly. A fiber may be terminated in the ferrule either before or after the preparation of the subassembly. For field-terminatable connectors, it may be preferable to dispose just a fiber stub in the ferrule. This configuration facilitates field installation of a fiber as discussed, for example, in WO2005004285. Regardless of whether a stub or a fiber is terminated in the ferrule, the preferred keying arrangement of the present invention in which slots radiate outwardly from the opening 802 allows the subassembly of the LC connector to be polished, inspected, and tested using standard polishing equipment as mentioned above.

Figure 12:
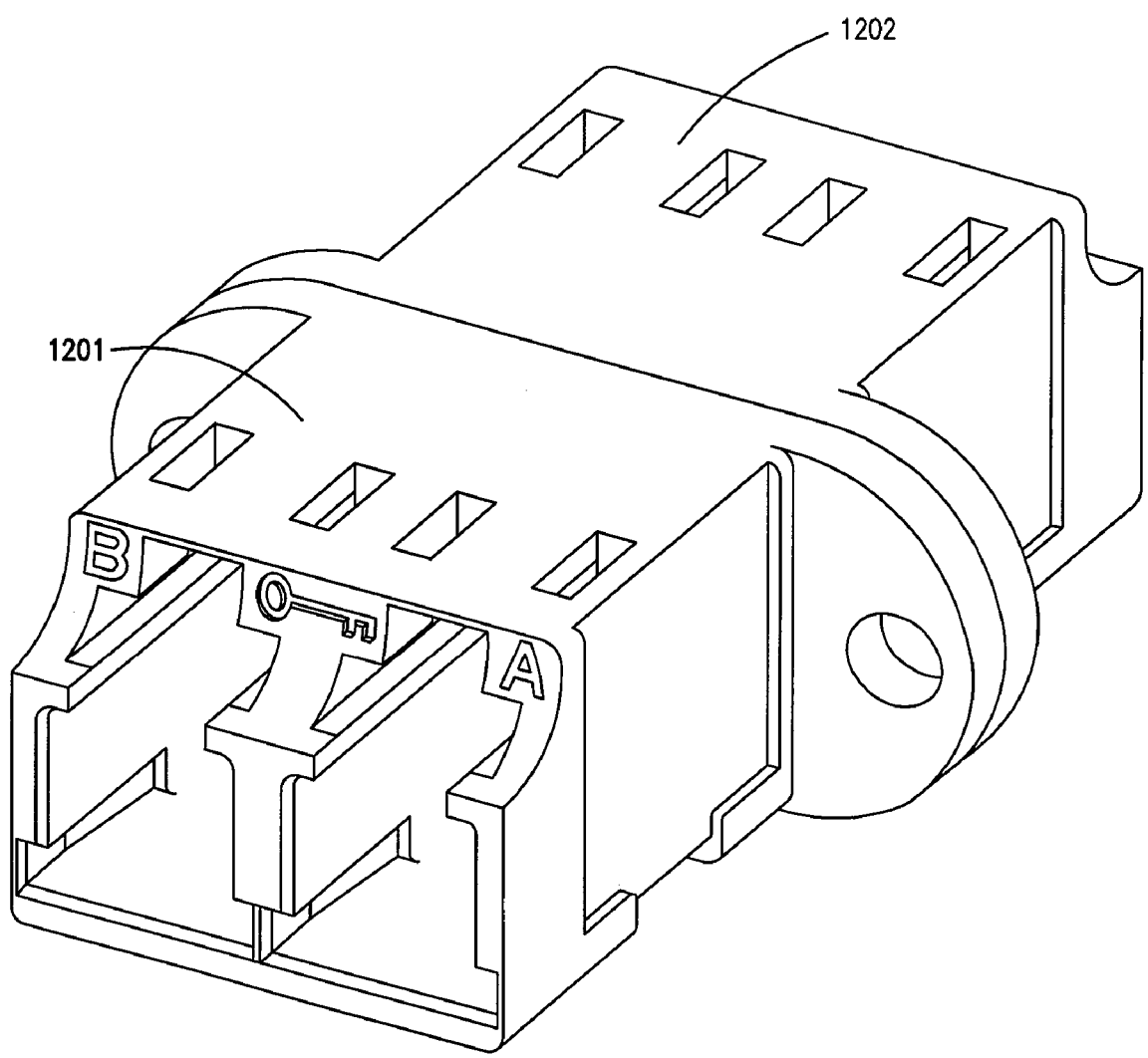
FIG. 12 shows a hybrid duplex in which one duplex receptacle is a secure and the other is a standards, non-secure receptacle.

An advantage of the connector system of the present invention is that different receptacles may be combined to form "hybrid" adapters. More specifically, aside from the second keying element extending outward from the ferrule receiving portion, the receptacles are the same as those used for standard connectors. This allows different receptacles to be combined back to back to form hybrid adapters. For example, referring to FIG. 12, a particularly preferred embodiment is shown in which, a secure receptacle 1201 is combined with a nonsecure receptacle 1202 by ultrasonically welding, or other known technique. Such a configuration is particularly useful in situations in which the nonsecure end of the adapter is located in an inherently secure area, for example, behind a wall or panel, where access is already limited. In other words, since connectors within cabinets and walls cannot be accessed readily after construction, the advantages derived from a secure connector at those ends would be minimal. Thus, it is preferable to use a nonsecure connector in these situations so the installer need not concern himself with the "proper" secure connector configuration during the installation of the infrastructure wiring.

To discriminate between secure and non-secure connector systems, the present invention provides for a secondary key & slot configuration, which is either non-existent or in a different position for all plugs and receptacles which are outside of the given connector system 800. For example, referring to FIG. 8, the first geometry comprises a secondary plug 810, which is shown in the same relative position for all plugs of a given set, but which may be in different positions as discussed below. Referring to FIG. 9, the second geometry of the geometry of the receptacle comprises a secondary slot 910 are preferably, but not necessarily, in the same position for all the receptacles of a given set of receptacles. The secondary slots 910 are adapted to receive secondary keys 810. This way, only plugs and receptacles of a given set of having accommodating secondary keys/slots will mate. In a preferred embodiment, at least a portion of the secondary key 810 is disposed in the plug and is an extension of the side loading structure which is an LC connector standard. Therefore, in the preferred embodiment, the secondary key not only provides for discriminating mating between secure and non-secure connectors, but also enhances side load strength.

It is worthwhile to note that the use of the secondary key/slot adds another security feature to the connector system—essentially another keying mechanism. This additional keying feature increases the number of permutations within a given connector system. That is, rather than maintaining the same secondary key and slot location for all connectors within a system, it can be moved to form different classes within the same family Preferably, the keying elements (primary and secondary) are positioned such that not mating pairs "stub" at about the same axial position relative to one another regardless of whether the connectors are interfering because they are different types of secure connectors or whether they are interfering because they are secure/non-secure connectors. This way, the user becomes accustomed to the point at which non-mating connector components interfere, thereby reducing the risk of the user forcing non-mating components together.

To provide a simple and readily apparent indication to the user of which plugs mate with which receptacles, it is preferable to mark mating pairs with indicia or color to indicate their compatibility. In a preferred embodiment, the components of a mating pair are a similar color different from all others used in the connector system.

The system described allows for a series of mutually-exclusive connectors to be used in a manner which provides physical security to a network system. In light of the often highly sensitive data stored on many of the networks in use today, this is a highly desirable feature. The present invention is an effective way to segregate separate networks and assure that the proper users are connecting to the desired network. Additionally, the present invention may be employed in the manufacture of devices in which fibers or wires need to be connected in particular arrangements. More specifically, the discriminating connectors of the present invention can be engineered into a system such that, during manufacturing, the correct connection of the fibers/wires is ensured by the mating pairs and their ability to prevent all other "incorrect" connections. Applications requiring particular routing of fibers or wires include, for example, routers, backplane assemblies, and even component devices such as multiplexers/demultiplexers.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. A connector system comprising:
a set of different optical plugs, each plug of said set of different optical plugs having a small factor housing having a front face defining an opening and a ferrule disposed in said opening, said opening adapted to receive a ferrule-receiving portion of a receptacle, said front face defining r number of first keying elements in a combination of n number of possible positions about said opening of each plug, said combination for each of said different optical plugs being unique, wherein r=n/2 if n is an even number, or r=(n±1)/2 if n is an odd number;
a set of different optical receptacles, each receptacle of said set of different optical receptacles having a cavity and a ferrule receiving portion defining a passage, and having said r number of second keying elements in a combination of said n number of possible positions, said combination for said each receptacle being unique and adapted to cooperate with one and only one combination of positions of said first keying element, wherein a plug of said set of different optical plugs and a receptacle of said set of different optical receptacles having cooperating said first and second keying elements are a mating pair such that said cavity of said receptacle receives said plug and said passage of said receptacle receives said ferrule of said plug; and
a secondary key extending from the housing of said each plug to prevent mating of said each plug to a receptacle not having a secondary slot to accommodate said secondary key;
wherein each of said set of different optical receptacles has said second keying element; and
wherein each mating pair corresponds to a particular color.

2. The connector system of claim 1, wherein said first keying elements comprise said r number of slots extending radially outward from around said opening in said n number of possible positions, and said second keying elements comprise said r number of keys extending radially from said passage in said n number of possible positions.

3. The connector system of claim 2, wherein there are nCr possible mating pairs, wherein:

$$nCr = \frac{n!}{r! \cdot (n-r)!}$$

n is the number of possible slot positions and r is the number of positions occupied by a slot.

4. The connector system of claim 1, wherein said receptacles are in an array of receptacles in which at least two receptacles are welded together back to back to facilitate optical coupling of two plugs.

5. The connector system of claim 2, further comprising at least one plug having greater than said r number of slots.

* * * * *